US011091009B2

(12) United States Patent
Skapof et al.

(10) Patent No.: US 11,091,009 B2
(45) Date of Patent: Aug. 17, 2021

(54) SYSTEMS AND METHODS FOR CONTROLLING VENTS OF A VEHICLE

(71) Applicant: Rivian IP Holdings, LLC, Plymouth, MI (US)

(72) Inventors: Robert Skapof, Novi, MI (US); Matthew Coburn, Milford, MI (US); Henry Huang, Ann Arbor, MI (US); Zulfiquar Ali, West Bloomfield, MI (US)

(73) Assignee: Rivian IP Holdings, LLC, Plymouth, MI (US)

(*) Notice: Subject to any disclaimer, the term of this patent is extended or adjusted under 35 U.S.C. 154(b) by 91 days.

(21) Appl. No.: 16/681,580

(22) Filed: Nov. 12, 2019

(65) Prior Publication Data

US 2020/0148032 A1 May 14, 2020

Related U.S. Application Data

(60) Provisional application No. 62/760,642, filed on Nov. 13, 2018.

(51) Int. Cl.
*B60H 1/00* (2006.01)
*B60H 1/34* (2006.01)

(52) U.S. Cl.
CPC ..... *B60H 1/00828* (2013.01); *B60H 1/00657* (2013.01); *B60H 1/00871* (2013.01); *B60H 1/00985* (2013.01); *B60H 1/3414* (2013.01)

(58) Field of Classification Search
CPC ............ B60H 1/00828; B60H 1/00657; B60H 1/00985; B60H 1/3414; B60H 1/00871; B60H 2001/3471; B60H 2001/3478; B60K 2370/126; B60K 35/00; B60K 37/06

See application file for complete search history.

(56) References Cited

U.S. PATENT DOCUMENTS

2018/0056750 A1\* 3/2018 Freese ................ B60H 1/00871

FOREIGN PATENT DOCUMENTS

| DE | 10 2012 021519 | | 5/2014 | | |
|----|----------------|----|--------|----|----|
| DE | 102012021519 | A1\* | 5/2014 | ......... | B60H 1/00985 |
| DE | 10 2017 003089 | | 1/2018 | | |
| DE | 102017003089 | A1\* | 1/2018 | ......... | B60H 1/00871 |
| EP | 3 067 227 | | 9/2016 | | |
| JP | 2018 016197 | | 2/2018 | | |
| JP | 2018016197 | A\* | 2/2018 | | |

OTHER PUBLICATIONS

Invitation to Pay Additional Fees in PCT/US2019/061027 dated Mar. 4, 2020.

\* cited by examiner

*Primary Examiner* — Emmanuel E Duke
(74) *Attorney, Agent, or Firm* — Haley Guiliano LLP

(57) ABSTRACT

Ventilation control systems and methods for a vehicle are presented. The system includes a touch screen that is configures to display an object and receive a selection of a part of the object. The system also includes an air vent that comprises at least one controllable fin and a motor that can control the configuration of that fin. A control circuitry of the system configures the fin, using the at least one motor, to direct air from the air vent to a location that corresponds to the selected part of the object.

20 Claims, 14 Drawing Sheets

SYSTEMS AND METHODS FOR CONTROLLING VENTS OF A VEHICLE

CROSS REFERENCE TO RELATED APPLICATION

This disclosure claims the benefit of U.S. Provisional Application No. 62/760,642, filed Nov. 13, 2018, which is hereby incorporated by reference herein in its entirety.

SUMMARY

The present disclosure is directed to an improved ventilation (e.g., cooling and/or heating) system of a vehicle. In particular, systems and methods are provided for controlling ventilation of a vehicle without manual controls of the vents by the driver. In addition, an apparatus is provided for improved control of direction and airflow of a ventilation system.

A typical vehicle includes manually operable vents for the ventilation system (e.g., heating or cooling system). The vents typically include fins which a user must manually adjust to achieve the desired air flow. However, constantly readjusting the fins of the vents is burdensome and impractical for a user who is otherwise busy driving a vehicle. For example, to manually reach some vents, the user would have to take the hand of the steering wheel, which decreases driving safety. Furthermore, the fact that fins of the vents must be reachable by the driver, limits the possible locations of vents to reachable areas of the vehicle (e.g., to certain parts of the instrument panel). Consequently, what is needed is a system for automatically controlling airflow of the vehicle vents with minimum input from the user. In particular a system is needed that would allow for controlling airflow of the vehicle without requiring the user to take the eyes away from the road.

In accordance with the present disclosure, systems and methods are provided that improve the operation of a ventilation system of a vehicle. A vehicle may include one or more air vents, each including at least one controllable fin. For example, each fin may be controllable by at least one motor and/or actuator to change its position as to control the flow of air in a selectable direction. For example, each vent may have an actuator for controlling horizontal orientation of the fins, and an actuator for controlling vertical orientation of the fins. Each vent may also include actuator-controllable valve for selectable adjustments of the intensity of the airflow through that vent. Advantageously, control of the fins and valves by the motor or actuator allows the direction and intensity of air flow to be changed without requiring the user of the vehicle to manually adjust the fins and/or valves of the vents.

In some embodiments, instead of the manual control, the fins and/or valves may be controlled by control circuitry of the vehicle based on input received via a digital user interface (e.g., via touchscreen controls). For example, the touchscreen may be configured to display at least one object (e.g., an object inside of the vehicle). The touchscreen can also be configured to receive input (e.g., touch output). For example, the user may use a finger touch to select the displayed object or a portion of objects. Once a selection is received, the processor the system may use the motor or actuator to adjust positions of the fins to direct airflow of the vents to a location in the vehicle that corresponds to the selected part of the object.

For example, the touchscreen may display a representation of a human body (e.g., representation of the driver and/or passengers). The user may then select a body part (e.g., head or torso) on the representation. In response to the selection, the system may adjust the vents (via motors or actuators) to direct airflow to the real body part corresponding to the selected body part of the representation.

In some embodiments, the user may input several consecutive selections of a plurality of parts of the object. For example, the user may touch the representation of the driver's head and then the representation of the driver's torso. In response, the system adjusts the vents based on the selections. For example, the system may, automatically, first direct the air to head and then after some period of time (e.g., sequentially) direct the air to the torso. Advantageously, the one-time consecutive selections reduce the need of the user to take the eyes off the road to make further adjustments to the ventilation system. In some embodiments, the selection of the temperature and airflow intensity may be selected sequentially as well. In this case, the system may change the temperature and airflow intensity in the selected sequential order.

In some embodiments, the system may store historical data of previous selections by the user. In this case, the system may adjust the selection of the parts of the objects based on historical data. For example, if a user who usually selects the head and then the torso, selects head and the stomach, the system may automatically change the selection of the stomach to the selection of the torso. In some embodiments, the system may also provide recommendations based on historical data. For example, the system may automatically display a recommendation to direct air first to the head and then to the torso.

Additionally, an apparatus is disclosed for enabling a single rotating member to control both the direction and intensity of airflow of a vent. The apparatus may be used as part of the ventilation to reduce the amount of motors and/or actuators needed to automatically control airflow of the vents in the embodiments described above and below. In some embodiments, a rotatable control member may include two routes (e.g., each comprising a straight portion and a portion that is curved along an arc having a constant radius centered on an axis of rotation of the control member). The apparatus may also include a flow direction member with a follower inserted into the first route, and a flow rate member with a follower inserted into the second route. The rotation of the control member may selectively control rotation of just the flow direction member or just the flow rate member as will be discussed in more detail below. In some embodiments, the selective control is accomplished by initially controlling direction of the flow (e.g., via rotation of single control member), and once the maximum angle of the flow is achieved, controlling the flow rate (e.g. by further rotation of the control member).

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

DETAILED DESCRIPTION

Figure 1A:
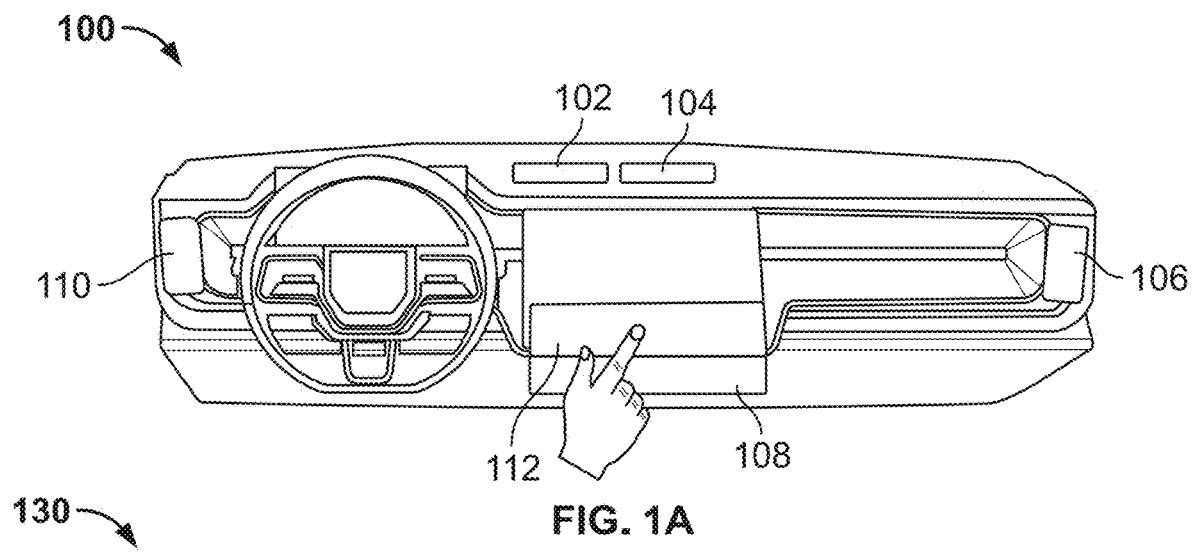
FIG. 1A shows a front view of a vehicle dashboard, in accordance with some embodiments of the present disclosure.

The present disclosure is directed to methods and systems for a ventilation system of a vehicle. For example, the system may be implemented using vehicle dashboard 100 depicted in FIG. 1A that shows a front view of a vehicle dashboard 100 of a vehicle, in accordance with some embodiments of the present disclosure.

In some embodiments, the vehicle ventilation system of a vehicle may include at least one air vent (e.g., air vents 102, 104, 106, 108, 110). In some embodiments, each or some air vents of air vents 102-110 may include fins which may be moved (e.g., rotated or translated) via at least one motor or actuator. In some embodiments, a single motor can control both vertical and horizontal orientation of the fins. In some embodiments, one motor may control vertical orientation of the fins, while another motor may control vertical orientation of the fins. In some embodiments, fins of the vent can be oriented to direct air from the vent into any suitable direction inside the vehicle.

In some embodiments, the vehicle ventilation system may include touch screen 112 (or another type of a user interface). In some embodiments, the touch screen may display an object to assist a user in directing the air flow of air vent 102-110. For example, the touch screen may display a representation of the driver, a representation of a passenger, a representation of a car seat, a representation of any other part of the vehicle interior, or any combination thereof. In some embodiments, the touch screen may be configured receive a selection of a part of the object. For example, the user may be able to select a head of the driver by touching representation of a head of a human body shown on the touch screen. In another example, the user may be able to select a bottom of the driver seat, by touching representation the bottom of the driver seat that is being displayed on the touch screen.

In some embodiments, the vehicle ventilation system may include control circuitry that is capable of interfacing with touch screen 112 and with a vent controller, that can configure fins of at vent 102-110 of the vehicle (e.g., by actuating at least one motor). In some embodiments, the control circuitry may be capable of configuring the plurality of fins such that the vent directs air to a location that corresponds to the selected part of the object. For example, if the user has selected chest of the driver via the touch screen, the control circuitry may use the at least one motor to move fins such that the vent directs the air to the chest of the driver. In some embodiments, some or all of vents 102-110 that are controlled by control circuitry via touch screen input may lack any kind of manual control of the fins (e.g., the fins may be concealed behind the faceplate of the vent.) This allows vents 102-110 to be placed in any location of the vehicle, even where it is not reachable by the driver or by any of the passengers.

In some embodiments, touch screen 112 may be configured to receive a plurality of consecutive selections of a plurality of parts of an object displayed on the touch screen. In some embodiments, the user may successively touch several body parts of a human body displayed on touch screen 112. For example, the control circuitry may detect that the user touched displayed face, displayed torso and then displayed legs. In some embodiments, the control circuitry may configure the plurality of fins of some or all of vents 102-110 based on the selections of the plurality of parts of the object. For example, the control circuitry may configure fins to direct air into a location that is a center of the plurality of the selected parts of the object. As another example, the control circuitry may configure fins of several of vents 102-110 to simultaneously direct air at each selected part of the object. In some embodiments, the control circuitry may configure fins to sequentially direct air of some or all vents 102-110 to each of the plurality of parts of the object. For example, the control circuitry may first direct air to the face of the driver. After a period of time, the control circuitry may first direct air to the torso of the driver. The time period may be a preset time period. In some embodiments, the time period may be long enough to change the temperature around face of the driver. Finally, after another period of time, the control circuitry may direct air to the feet of the driver.

In some embodiments, the control circuitry may receive historical selection data. For example, historical selection data may include touch screen selections previously made by the driver or by a plurality of other users. In some embodiments, the control circuitry may use the historical selection data to adjust selection of the plurality of parts of the object. For example, the control circuitry may determine that a selection of a neck is usually a mistake (e.g., because the driver commonly switches the selection of the neck to a selection of the face). In this case, the control circuitry may automatically switch the selection of the neck to selection of the face.

In some embodiments, the control circuitry may analyze the selection history of the driver (and of other users) to generate a recommended selection of a plurality of parts of the object. For example, the control circuitry may learn that a certain user generally prefers to warm her legs first before switching to heating the torso or head. In this example, the control circuitry may generate a recommendation for display on touchscreen 112 inviting the user to touch a representation of legs first, then a representation of the torso, and then a representation of the head. In some embodiments, the touch screen may display the recommended selection on touchscreen 112. For example, the control circuitry may show a phantom circle with number "1" near the representation of legs, a phantom circle with number "2" near the representation of torso, and a phantom circle with number "3" near the representation of head.

In some embodiments, the control circuitry may learn how the user prefers to configure the airflow, and engage the preferred vent configuration, by default, without further input from the user. In some embodiments, the control circuitry may learn which air vent configuration is most effective at heating or cooling the vehicle the fastest. In some embodiments, the control circuitry may engage the optimized configuration automatically (e.g., when vehicle is started or when it reaches a certain threshold speed). In some embodiments, the control may prompt the user to engage the optimized configuration via a prompt displayed on touchscreen 112.

In some embodiments, touch screen 112 may also be configured to receive a temperature selection. For example, the touch screen may display a temperature value which may be adjusted by the user (e.g., via virtual arrows or a virtual dial). In some embodiments, the control circuitry may adjust the temperature of air delivered via the air vent based on the temperature selection. For example, the control circuitry may engage one of cooling system or heating system of the vehicle based on the selection. In some embodiments, the control circuitry may also control valves of some or all of vents 102-110 to further control the temperature.

In some embodiments, the touch screen may be configured to receive a plurality of consecutive temperature selections. For example, the control circuitry may receive a selection of 75 degrees followed by 72 degrees. In some embodiments, the temperature selection may be made along with selection of a plurality of parts of the object. For example, the user may request to cool the vehicle area around the users' head to 75 degrees, followed by cooling the vehicle area around the torso to 72 degrees. In some embodiments, the control circuitry may be configured to sequentially adjust the temperature of air delivered via the air vent based on consecutive temperature selections. For example, the control circuitry may direct 75 degree air to head of the driver, followed by directing 72 degree air to torso of the driver.

In some embodiments, touchscreen 112 may also include user interface elements (e.g., a button or radio selections element) for selectively enabling or disabling ventilation. For example, touchscreen 112 may include user interface elements for turning off or on ventilation for the drive and/or for any of the passengers.

FIG. 1A further shows exemplary location of air vents 102-110 on a dashboard 100 of a vehicle, in accordance with some embodiments of the present disclosure. In some embodiments, vehicle dashboard 100 may include touchscreen 112 configured to receive user selection of a part of a displayed object (e.g., as described above). In some embodiments, vehicle dashboard 100 may include automatic air outlets of vents 102-110 of the vehicle. In some embodiments, the air outlets may be hidden from a driver of the vehicle. For example, the user may have no direct access to fins of the air vents 102-110. This allows some or all vents 102-110 to be placed in locations that are not reachable by the driver of the vehicle while operating the vehicle. For example, air outlets of vents 102-110 may be located to the left of the steering wheel, on top and bottom of touch screen 112 and to the far right of the control panel. In some embodiments, the control circuitry of the vehicle may adjust fins of the vents to direct air based on the touchscreen input (e.g., as described above and below).

Figure 1B:
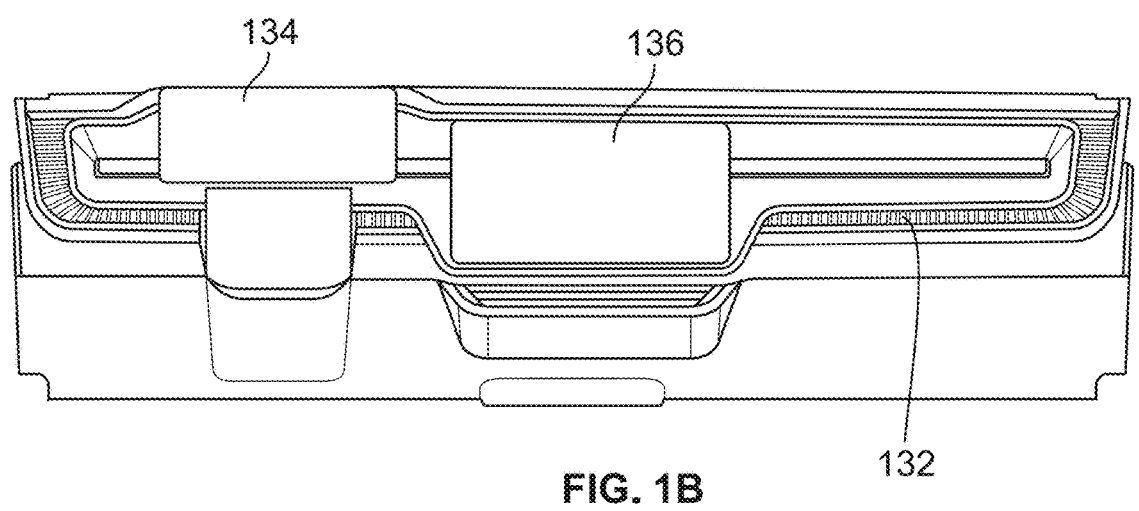
FIG. 1B shows another front view of a vehicle dashboard, in accordance with some embodiments of the present disclosure.

FIG. 1B shows another front view of a vehicle dashboard 130 of a vehicle, in accordance with some embodiments of the present disclosure. In this example, the air outlet of vent 132 is configured to be extended in a U-shape across the face of dashboard 130. In some embodiments, vent 132 may have no manual controls for airflow direction and intensity. This is possible because vent 132, as described by this disclosure, does not need to be manually controlled by the user and can include motor-controlled fins that are completely obscured from the driver's view. In some embodiments, the dashboard of a vehicle may include touchscreen 134 and touchscreen 136. Each of the touchscreen 134 and 136 may be used to control air flow from the air outlet of vent 132 (e.g., as describe above and below).

Figure 1C:
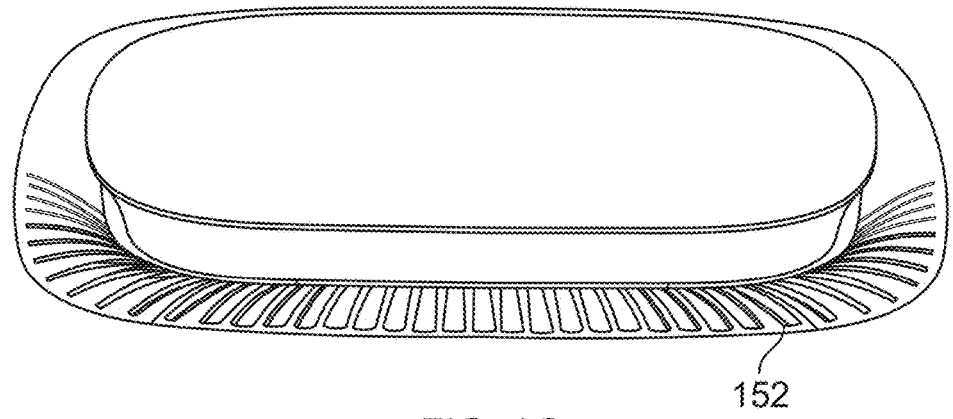
FIG. 1C shows an exemplary shape of a vent, in accordance with some embodiments of the present disclosure.

FIG. 1C shows an exemplary shape of an air outlet of vent 152 (e.g., similar to vent 132 shown in FIG. 1B), in accordance with some embodiments of the present disclosure. In some embodiments, the air outlet may extend along the dashboard and lack any exposed controls for the fins.

FIGS. 2A-D show several illustrations of a vehicle dashboard, in accordance with some embodiments of the present disclosure. In particular, FIGS. 2A-D show several possible arrangements of vents on a dashboard of the vehicle. While four exemplary arrangements are shown, one skilled in the art would recognize that any other suitable arrangements of vents may be used. Additionally, while the vents are depicted as placed along vehicle dashboard, in other embodiments, vents may also (or instead) be placed in any other suitable part of the vehicle. In some embodiments, some vents (motor vents) may be fully controlled motor vents. For example, these may be vents that include fins that can be rotated or translated by motors to change the directions of the airflow. In some embodiments, each such motorized vent may also include a motor-controlled valve for controlling intensity of the air flow. In some embodiments, some vents (unidirectional vents) may include the motor-control control valves, but lack motor-controlled directional fins. Each of the motor vents and unidirectional vents may be controlled by control circuitry based on touch screen inputs as described above and below. As can be seen in FIGS. 2A-D, motor vents and unidirectional vents can be placed in a variety of "out-of-reach" positions (e.g., behind the steering wheel, or to far right of the driver) that cannot be reached by the user, because such vent and motor outlets do not require manual user control.

Figure 2A:
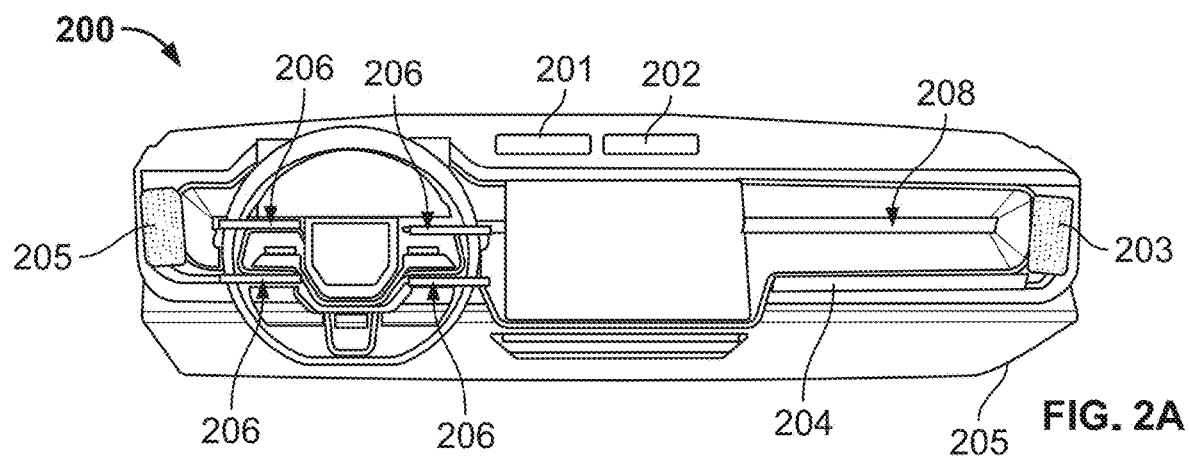
FIGS. 2A-2D shows several more illustrations of a vehicle dashboard, in accordance with some embodiments of the present disclosure.

FIG. 2A shows vehicle dashboard 200 with unidirectional placed behind the steering wheel, unidirectional vents 201 and 202 placed on top of the touchscreen, and unidirectional vents 204 and 208 placed on the right side of the instrument panel. Additionally, motor vents 203 and 205 are placed to the far right and far left of the instrument panel.

Figure 2B:
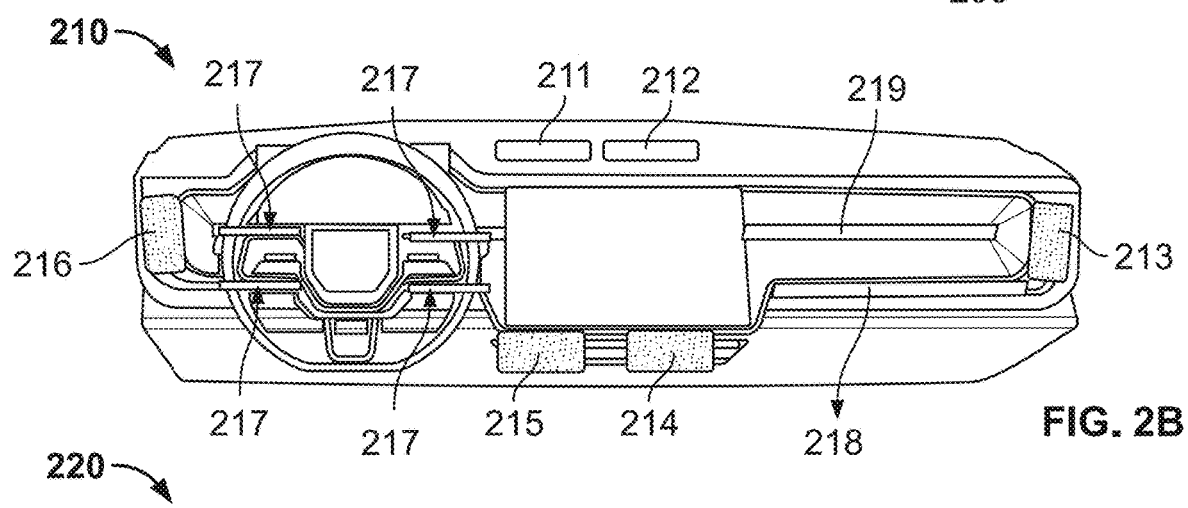

FIG. 2B shows vehicle dashboard variant 210 with motor vents 213, 216, 214, and 215 and unidirectional vents 217, 211, 212, 218, and 219.

Figure 2C:
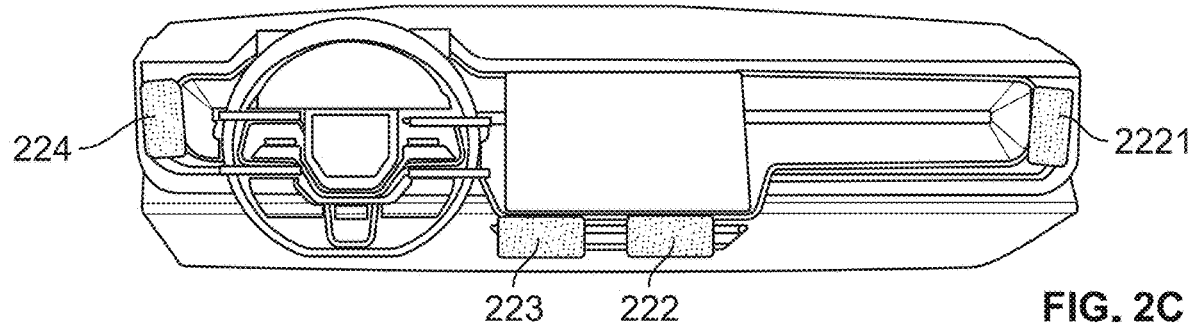

FIG. 2C shows vehicle dashboard variant 220 with motor vents 221, 222, 223, and 224.

Figure 2D:
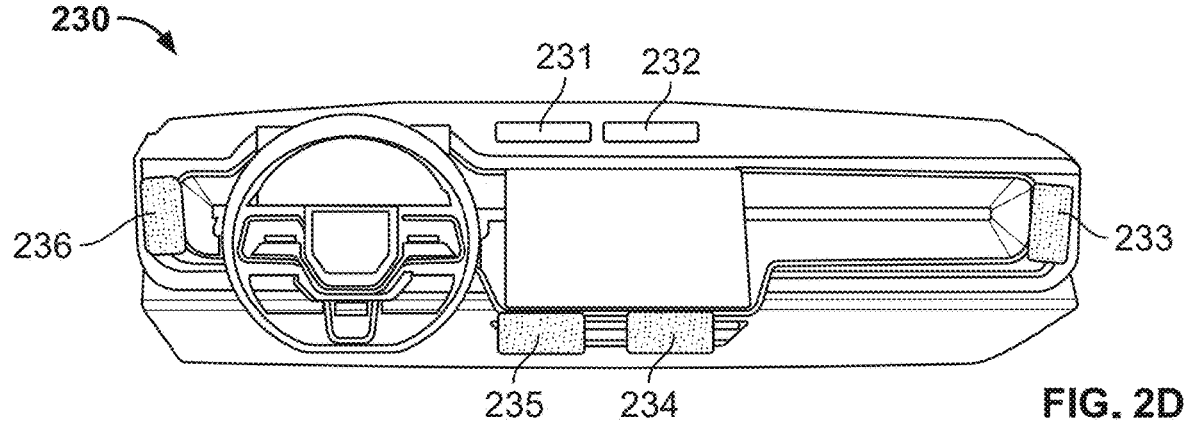

FIG. 2D shows vehicle dashboard variant 230 with motor vents 236, 233, 235, and 234 and unidirectional vents 231 and 232.

Figure 3:
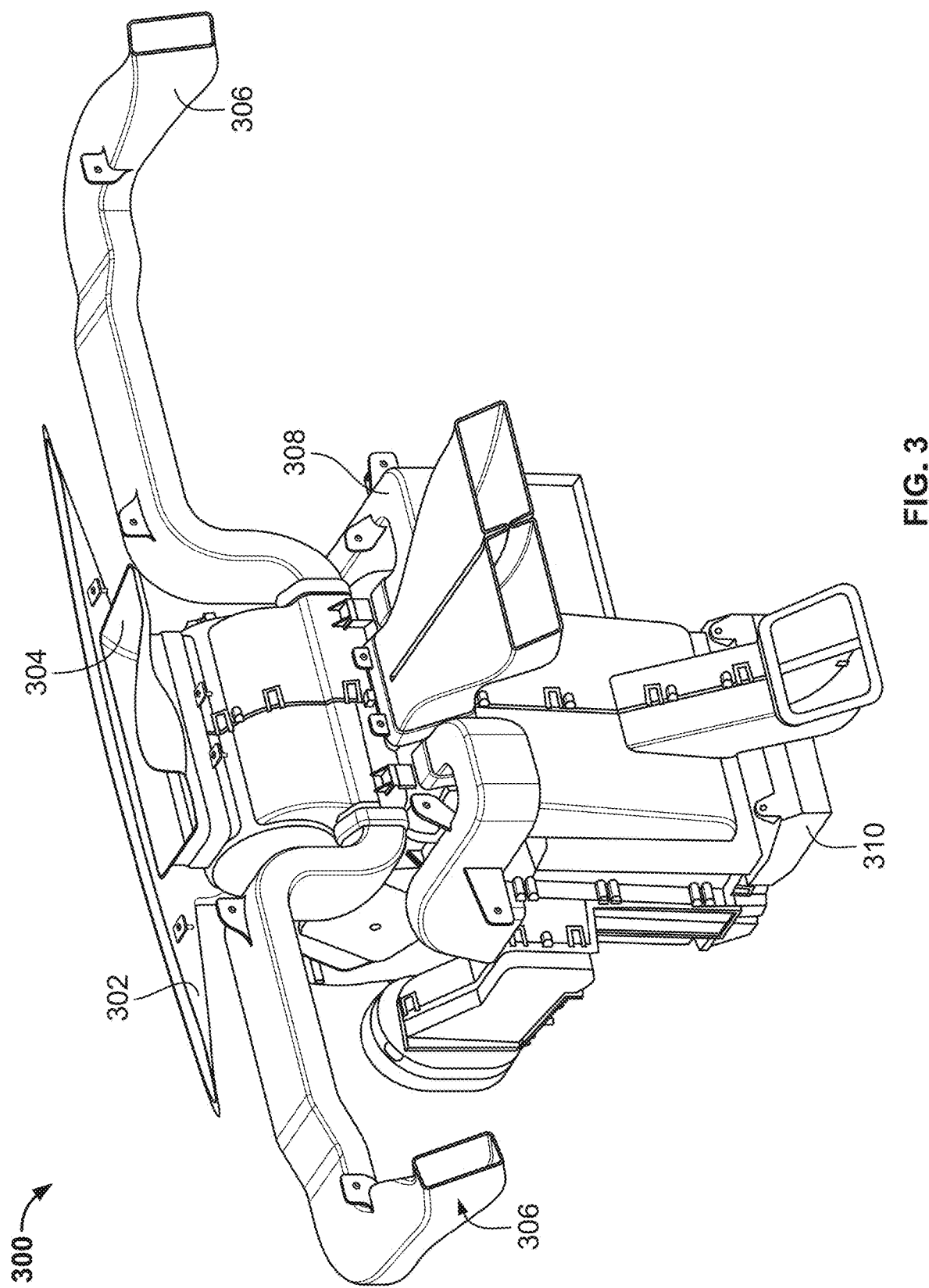
FIG. 3 shows an illustration of several ducts and vents of a vehicle, in accordance with some embodiments of the present disclosure.

FIG. 3 shows an illustration of ventilation system 300 of a vehicle having ducts and vents, in accordance with some embodiments of the present disclosure. In some embodiments, ventilation system 300 may include assembly 310 for driving air to all other ducts (e.g., by operation of a compressor, a pump, a fan, or a vacuum). In some embodiments, ventilation system 300 may include several different vent ducts 302-308. For example, ventilation system 300 may include several vent ducts for one or more vents 102-110 of FIG. 1. In some embodiments, the vehicle may include face ducts 306, foot ducts 308, ambient air duct 304, and windshield defrost duct 302. In some embodiments, the control circuitry of the vehicle may control airflow from each of the ducts 302-308 using a respective valve for each duct 302-308. For example, the control circuitry may completely close a valve to stop all air flow, or partially open a valve to control the rate of the airflow. In some embodiments, the control circuitry of the vehicle may control airflow from each of the ducts using a respective blower motor or fan for each duct.

In some embodiments, some (or all) of ducts 302-308 may include fins to control direction of the airflow. For example, each of face ducts 306 may include fins that can control horizontal and vertical direction of the air flow. In some embodiments, the fins maybe driven by at least one motor under control of the control circuitry. In some embodiments, the control circuitry may control the directions of the fins as describe above or below.

In some embodiments, ventilation system 300 may include four face duct routes from the ventilation system (e.g., a cooling system and heating system) to four outlets. In some embodiments, the vent system may include two foot duct routes from the ventilation system to two outlets in a footwell of the vehicle (e.g., one each side). In some embodiments, the vent system may include three defrost routes (one duct to the front glass, one duct to driver side glass, and one duct to passenger side glass). In some embodiments, the ventilation system may include valves to divert air into one or more of these pipe routes.

In some embodiments, the outlets of face vents 306 may have motorized moving fins that are hidden from the users of the vehicle behind a fixed cage or grill (e.g. behind a grille shown in FIG. 1C). In some embodiments, the fixed grills may be designed to promote air flow through the grill to meet air flow performance targets. In some embodiments, fins of the vents are motorized. For example, each vent may have a motor to control horizontal orientation of the fins, and one motor to control the vertical orientation of the fins (e.g. there may be eight total motors). In some embodiments, each motor can be directed to go to a specific position, so airflow reaches a specific position. For example, a motor can drive the fins to have vertical rotation angle of 40 degrees and horizontal rotation angle of 20 degrees to achieve air direction target (e.g., direction selected via a touchscreen).

In some embodiments, air can be automatically fully turned off at each vent by turning the fins (using a motor) completely to the left, completely to the right, completely up, or completely down. In some embodiments, the ventilation system may be configured without valves (e.g., flow control valves described above), because air flow can be stopped and started at each valve outlet using the motorized fins.

In some embodiments, the ventilation system 300 may not have dedicated ducts and outlets for side window defrost operations. Instead, side defrost functionality may be achieved by using motorized fins to control airflow from other air outlets toward the side windows. In some embodiments, ventilation system 300 (e.g., at the end of ducts 306) may include an assembly configured to divert air for the purpose of performing side defrost operations while simultaneously preventing too much air being directed to the side window (e.g., at a detriment to other airflow). The assembly is described in more detail below with reference to FIGS. 9-13.

In some embodiments, any one (or several) of the face ducts, foot ducts, ambient air duct, and windshield defrost duct may be removed, while their functionality may be imitated by using motorized fins of other vents to control airflow in way that mimics the operation of the removed duct.

Figure 4A:
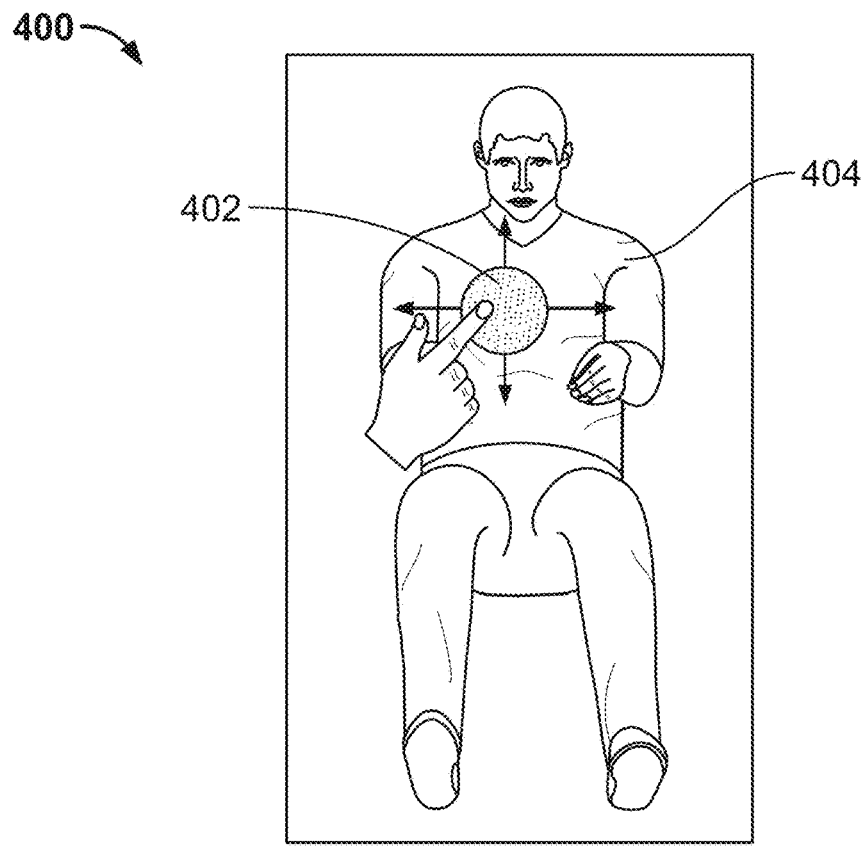
FIG. 4A shows an illustration of a user interface of a vehicle, in accordance with some embodiments of the present disclosure.

FIG. 4A shows an illustration of a user interface 400 of a vehicle, in accordance with some embodiments of the present disclosure. In some embodiments, FIG. 4A shows a portion of one of touch screen 112, 134, and 136 of FIGS. 1A and 1B. In some embodiments, user interface 400 may be used to configure airflow from at least one vent of the vehicle. For example, user interface 400 may display representation 400 of a driver or a passenger. In some embodiments, a user (e.g., a driver or passenger) may drag an indicator 402 over the representation of the body to select a location in the vehicle. In some embodiments, the control circuitry may then configure fins of an air vent (e.g., some or all air vents 102-110 of FIG. 1A) to direct airflow to the selected location. For example, when the chest is selected on interface 400 (as shown in FIG. 4A), the control circuitry may direct airflow toward the chest of the driver (or the passenger).

Figure 4B:
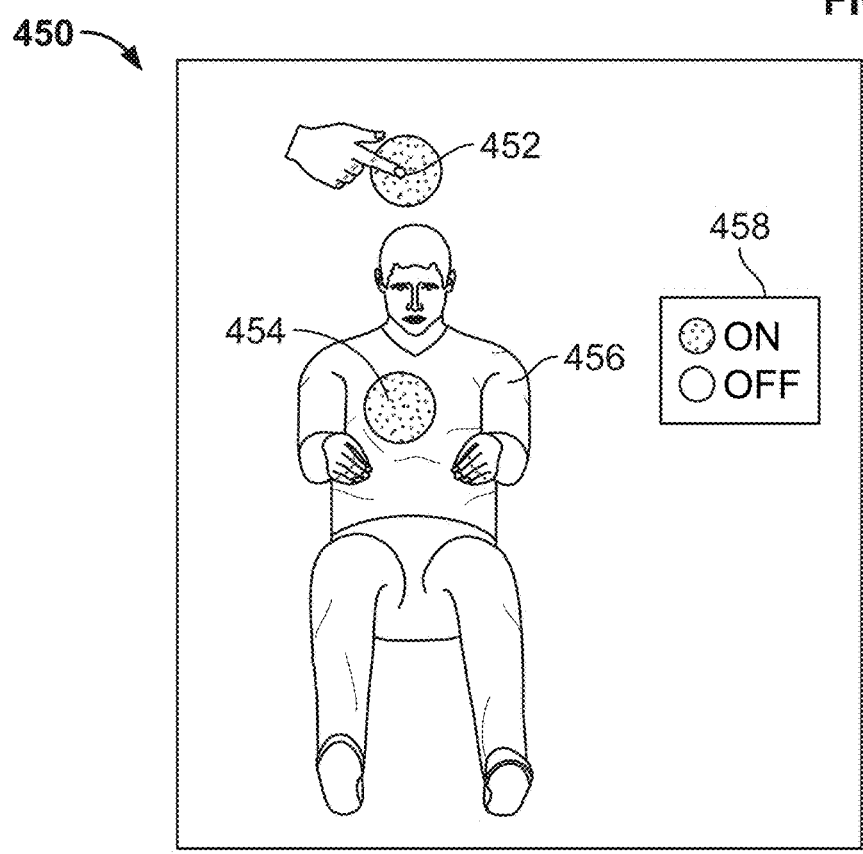
FIG. 4B shows another illustration of a user interface of a vehicle, in accordance with some embodiments of the present disclosure.

FIG. 4B shows an illustration of user interface 450 of a vehicle, in accordance with some embodiments of the present disclosure. In some embodiments, FIG. 4B shows a portion of one of touch screen 112, 134, and 136 of FIGS. 1A and 1B. In some embodiments, user interface 450 may be used to configure airflow from at least one vent of the vehicle (e.g., from any one or several of vents 102-110 of FIG. 1A). For example, user interface 450 may display representation 456 of a driver or a passenger. In some embodiments, a user (e.g., a driver or passenger) may sequentially place multiple indicators 452 and 454 over representation 456 of the body to select a plurality of locations. In some embodiments, the control circuitry may direct airflow to both selected locations at the same time. In some embodiments, the control circuitry may sequentially direct the airflow to the selected locations corresponding to selections 452 and 454. For example, the control circuitry may direct the airflow to the chest of the driver (or a passenger), and after a certain period of time, the control circuitry may direct the airflow to pass over a location on top of the head of the driver (or a passenger) as shown in FIG. 4B).

In some embodiments, interface 450 includes user interface element 458 which may be used to turn ventilation on or off (e.g., by touching element 458). In some embodiments, the ventilation may be turned on without interface element 458 (e.g., by registering a touch on any part of interface 450).

Figure 5A:
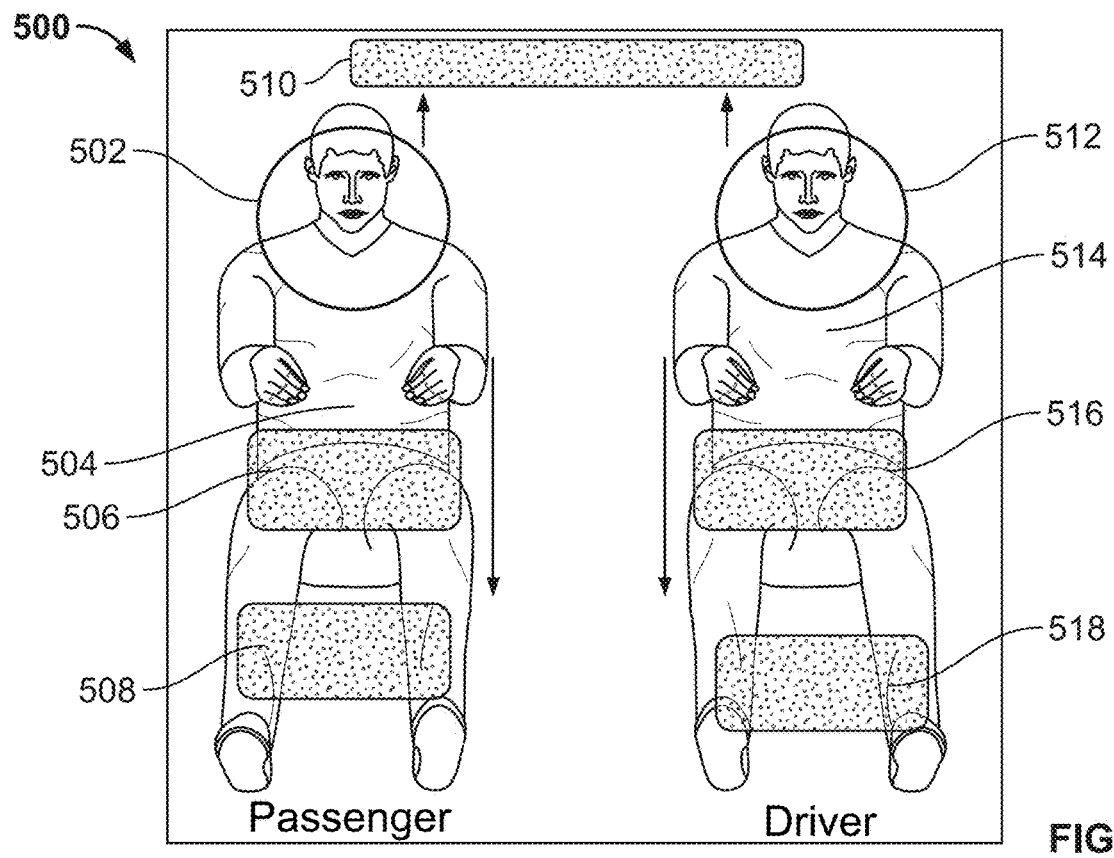
FIG. 5A shows another illustration of a user interface of a vehicle, in accordance with some embodiments of the present disclosure.

FIG. 5A shows another illustration of user interface 500 of a vehicle, in accordance with some embodiments of the present disclosure. In some embodiments, FIG. 5A shows a portion of touch screen 112 of FIG. 1A. In some embodiments, user interface 500 may be used to configure airflow from at least one vent of the vehicle (e.g., vents 102-110 of FIG. 1A). For example, user interface 500 may display representation of a passenger 504 and a driver 514. In some embodiments, passenger 504 may appear on the right side and a driver 514 on the left side (e.g., passenger and driver representation may be swapped from what is shown in FIG. 5A).

In some embodiments, a user (e.g., a driver or passenger) may sequentially place multiple indicators over the representation of the bodies 504 and 514 to select a plurality of locations (e.g. waist 506, feet 508, head 502 and ceiling 510) of the passenger and other areas of the vehicle.

In some embodiments, the user interface may also be used to select a temperature (e.g., to select flow of cold temperature air from the vents when the interior of the car is hot). In some embodiments, the user may select the temperature by clicking one of temperature options displayed on the touch screen. In some embodiments, the user may select the temperature by using virtual up and down arrows displayed on the touch screen to adjust a temperature value displayed on the screen. In some embodiments, the user may select the temperature by turning a virtual dial displayed on the touch screen to adjust a temperature value displayed on the screen. For example, the user may select a temporary value of "73 degrees."

In some embodiments, the control circuitry may engage the ventilation system of the vehicle and sequentially direct the airflow (e.g., by moving the fins of the vents) to the selected locations. In the shown example, because the user sequentially selected (e.g. by touch) locations 502, 506, 508 (which represent head, waist, and feet of the passenger) and location 510 (which represents the ceiling of the vehicle) the control circuitry may sequentially direct the air toward the head of the passenger, toward the waist of the passenger, then over the feet of the passenger, and then toward the ceiling.

In some embodiments, vent control for the driver (or passenger) may be mirrored with vent controls for the passenger (or driver). For example, selection of locations 502, 506, 508 for the passenger may be mirrored by automatic selection of locations 512, 516, 518 for the driver (and vice versa). In this embodiment, selection of a vent sequence for the driver results in the selection of a similar vent sequence for the passenger. In some embodiments, air flow over the driver and the passenger may be controlled separately.

Figure 5B:
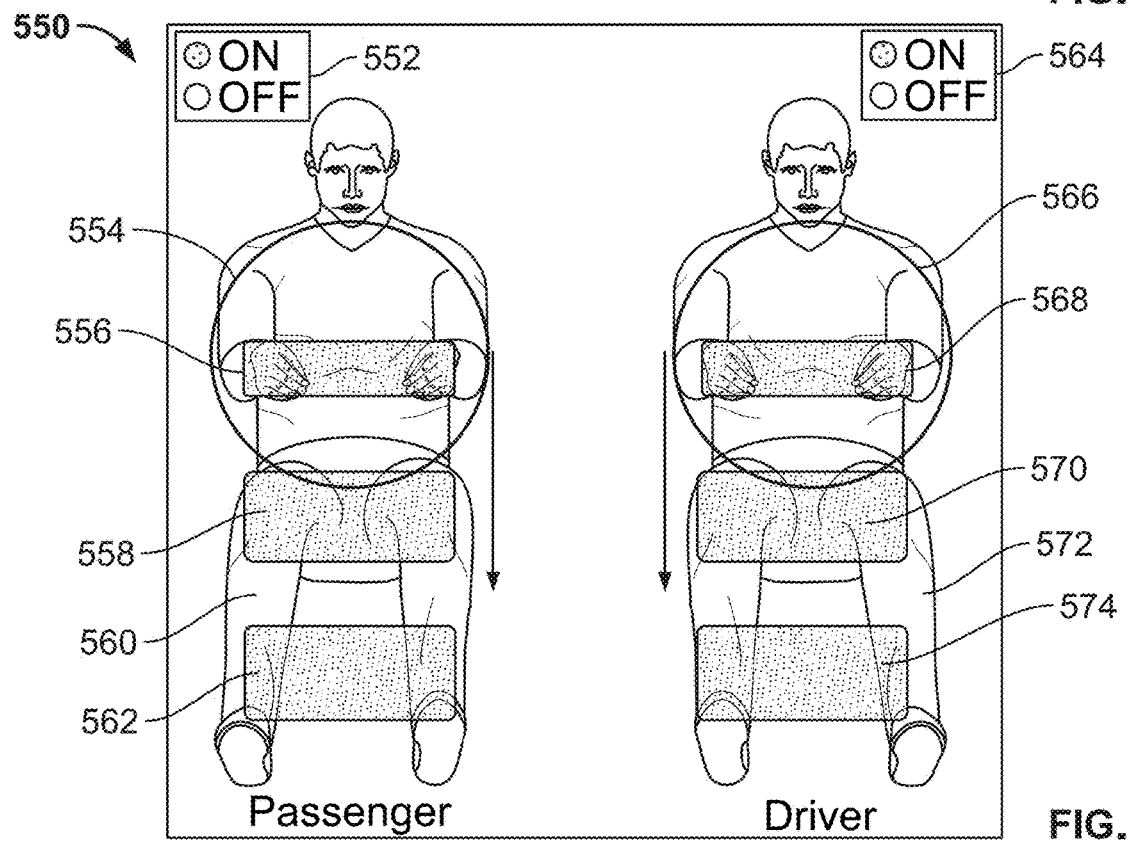
FIG. 5B shows another illustration of a user interface of a vehicle, in accordance with some embodiments of the present disclosure.

FIG. 5B shows another illustration of a user interface 550 of a vehicle, in accordance with some embodiments of the present disclosure. In some embodiments, FIG. 5B shows a portion of touch screen 112 of FIG. 1A. In some embodiments, user interface 550 may be used to configure airflow from at least one vent of the vehicle (e.g., vents 102-110 of FIG. 1A). For example, user interface 550 may display representation of a passenger 560 and a driver 574. In some embodiments, passenger 560 may appear on the right side and a driver 574 on the left side (e.g., passenger and driver representation may be swapped from what is shown in FIG. 5B).

In some embodiments, a user (e.g., a driver or passenger) may drag indicators 566 over the representation of the bodies 560 and 572 to select a plurality of locations (e.g. chest 556, feet waist 558, and feet 562) of the passenger.

In some embodiments, the control circuitry may engage the heat system (e.g., because hot air was selected) of the vehicle and sequentially direct the airflow (e.g., by moving the fins of the vents) to the selected locations. In the shown example, because the user sequentially selected (e.g. by dragging indicator 554) locations 556, 560, 562 (which represent chest, waist, and feet of the passenger) the control circuitry may sequentially direct the air toward the chest of the passenger, toward the waist of the passenger, then over the feet of the passenger.

In some embodiments, vent control for the passenger (or driver) may be mirrored with vent control for the driver (or passenger). For example, selection of locations 556, 558, and 558 for the passenger may be mirrored by automatic selection of locations 568, 570, 574 for the driver (and vice versa). In this embodiment, selection of a vent sequence for the driver results in the selection of a similar vent sequence for the passenger. In some embodiments, air flow over the driver and the passenger may be controlled separately (e.g., by moving indicators 566 and 554 separately).

In some embodiments, interface 550 includes user interface elements 552 and 564 which may be used to turn ventilation on or off separately for the driver and passenger. For example, touch of element 552 may lead to activation of ventilation for the passenger, and separately, touch of element 564 may lead to activation of ventilation for the driver. In some embodiments, the ventilation may be turned on without interface element 552 and 564. For example, touch of representation of body 560 may result in activation of ventilation for the passenger, and touch of representation of body 572 may result in activation of ventilation for the driver.

Figure 6:
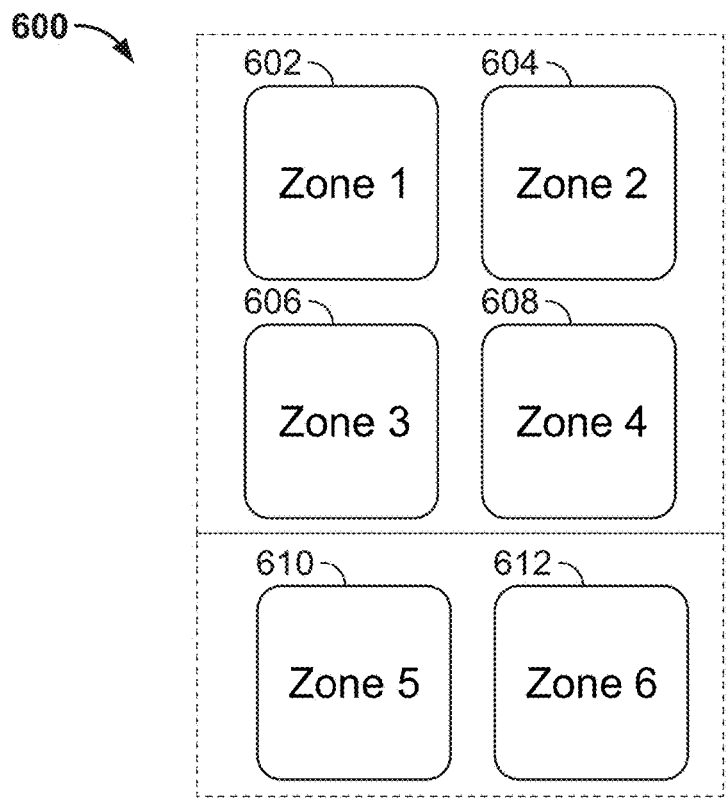
FIG. 6 shows yet another illustration of a user interface of a vehicle, in accordance with some embodiments of the present disclosure.

FIG. 6 shows yet another illustration of a user interface 600 of a vehicle, in accordance with some embodiments of the present disclosure. In some embodiments, FIG. 6 shows touch screen 112 or 136 of FIGS. 1A, 1B. In some embodiments, user interface 600 may be used to configure airflow from at least one vent of the vehicle (e.g., vents 102-110). In some embodiments, the user interface may be used to control zones 602-608 (and optionally zones 610 and 612) of the vehicle. For example, zones 610 and 612 may optionally appear for vehicles that have a third row. In some embodiments, each of zones 602-612 may include a representation of an object (e.g., seat or human bodies).

In some embodiments, a user may select a part of the objects in any zone to direct air to that location. For example, zone 602 may include a representation of the driver. By selecting a portion of a representation of the driver, a user may select the direction of the airflow in zone 602 of the vehicle. Similarly, the airflow direction may be selected for each of the zones 604-612 of the vehicle. In some embodiments, selection of one of the zones 602-612 may result in a zoomed in view of that zone. For example, selection of zones 602 and 604 may result in display of user interface 500 or 600 (of FIGS. 5 and 6).

Figure 7:
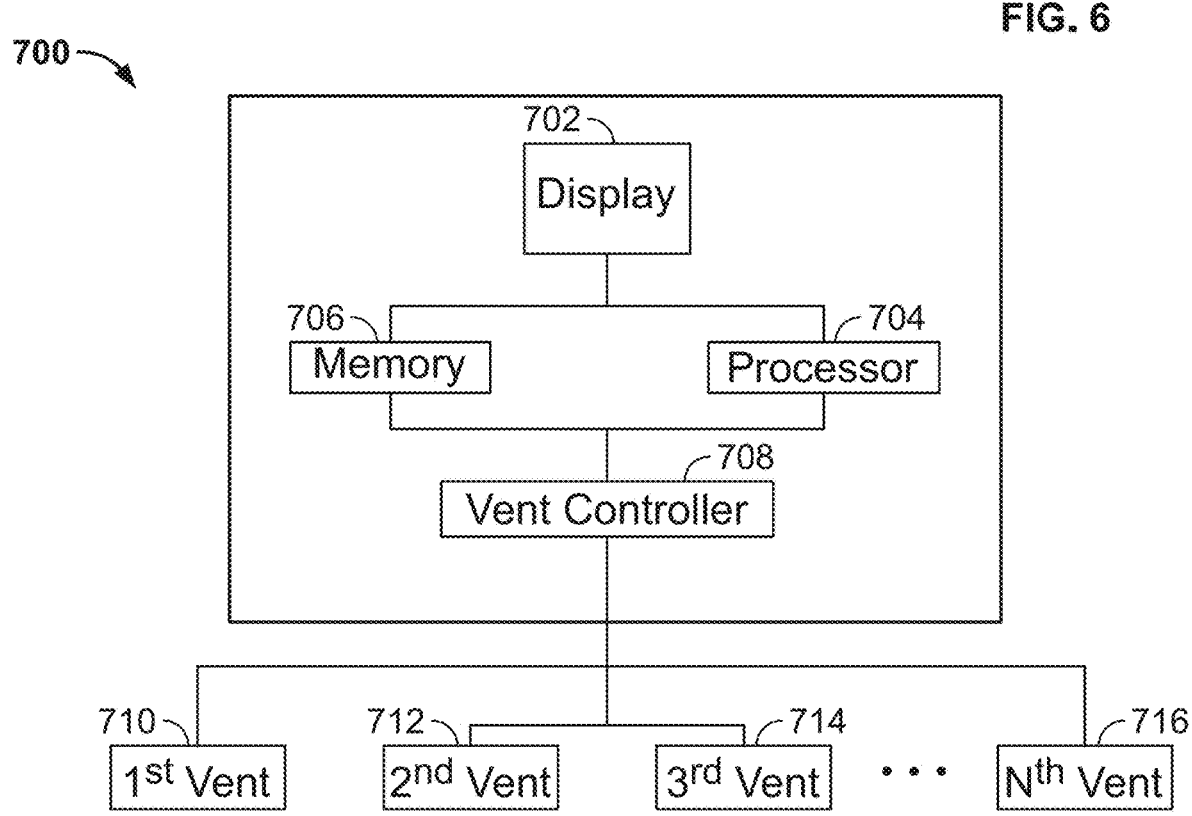
FIG. 7 shows a block diagram of components of a ventilation system, in accordance with some embodiments of the present disclosure.

FIG. 7 shows a block diagram of components of ventilation system 700 of a vehicle, in accordance with some embodiments of the present disclosure. In some embodiments, ventilation system 700 may be the same as the ventilation system shown in FIG. 3. In some embodiments, ventilation system 700 may include processor 704. Processor 704 may comprise a hardware CPU for executing commands stored in memory 706 or software modules, or a combination thereof. In some embodiments, processor 704 and memory 706, in combination, may be referred to as control circuitry of system 700. In some embodiments, processor 704 alone may be referred to as control circuitry of system 700.

In some embodiments, ventilation system 700 may include memory 706. In some embodiments, memory 706 may include hardware elements for non-transitory storage of commands or instructions, that, when executed by processor 704, cause processor 704 to operate ventilation system 700 in accordance with embodiments described above and below.

In some embodiments, processor 704 may be communicatively connected to display 702 (e.g., a touchscreen display). The display (e.g., touchscreen 112 in FIG. 1A) may be used to receive a selection of a location or locations of where the air should be directed to (e.g., as described in various embodiment above).

In some embodiments, processor 704 may be communicatively connected (e.g., via a vent controller 708) to several vents (e.g., vents 710-716). In some embodiments, each of the vents 710-716 (e.g., vents shown in any of the FIGs. above) may be controlled via at least one motor-controlled or actuator-controlled valve and may include fins that are controllable by at least one motor or actuator. In some embodiments, each of the vents 710-716 may have be controlled by a separate blower motor. For example, processor 704 may activate (e.g., using the vent controller) each of the separate blower motors initially to direct air through one vent, through all vents, or through any combination of vents 710-716. In some embodiments, processor 704 may control valves and fins of the vents via a vent controller 708. For example, the vent controller may provide power to drive motors to open and close the valves and change orientation of the fins for each of the vents 710-714.

Figure 8:
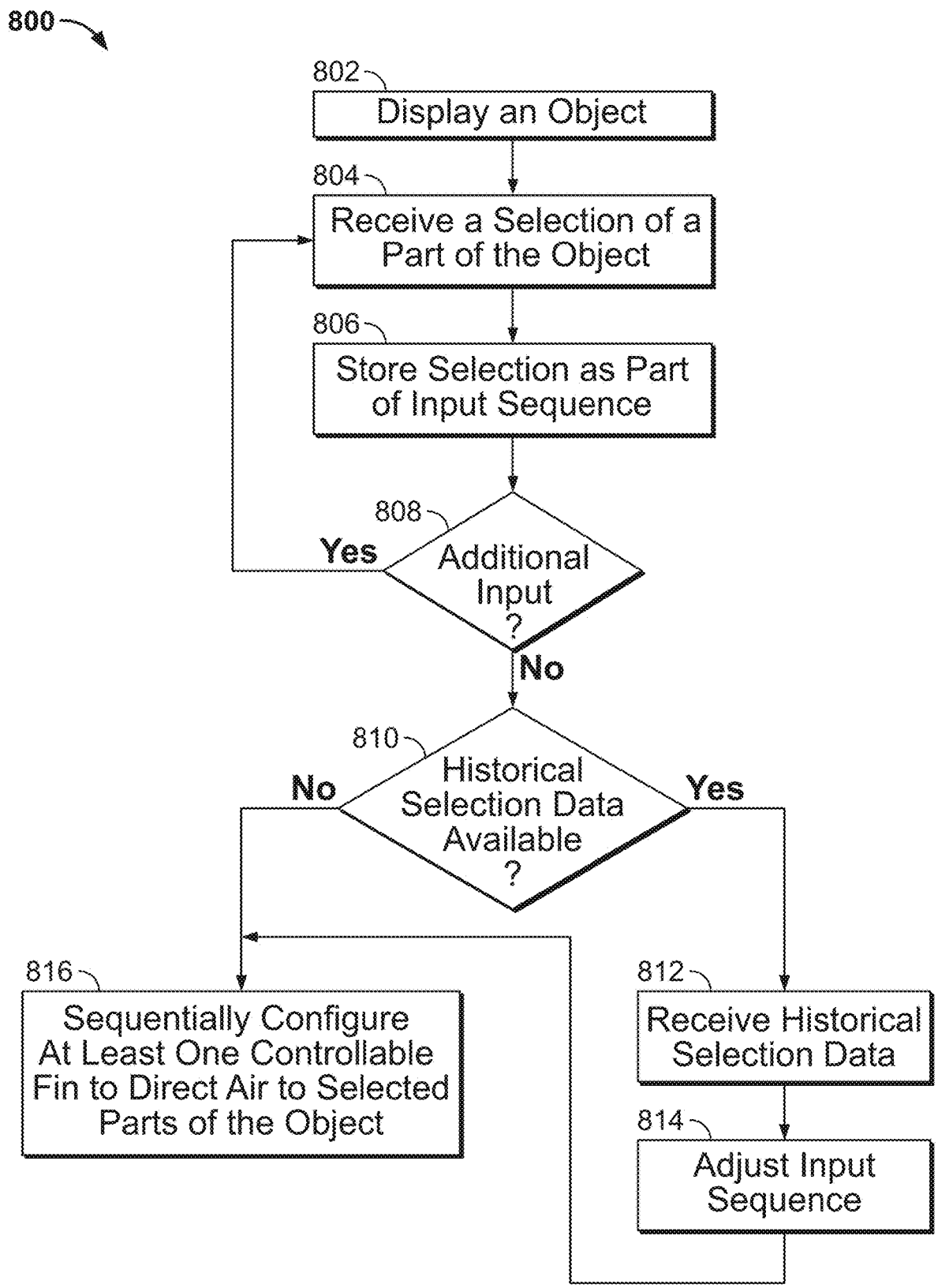
FIG. 8 shows a flowchart for a method of operating a ventilation system of a vehicle, in accordance with some embodiments of the present disclosure

FIG. 8 is an illustrative flowchart of a process 800 for controlling a ventilation system (e.g., system 700 of FIG. 7), in accordance with some embodiments of the disclosure. Process 800 may be executed by control circuitry (e.g., by processor 704 of FIG. 7).

At 802, the control circuitry may display at least one object (e.g., a shape of a human in a driver seat) on a display (e.g., display 702). At 804, the control circuitry may receive a selection (e.g., via touch screen) of a part of an object (e.g., a user may select a head of the human shape).

At 806, the control circuitry may store, the input as part of sequence of input (e.g., in a temporary table). At 808, the control circuitry may check if additional input was received. For example, the control circuitry may check if the user slid the touch to another location after initial touch at step 804. In another example, the control circuitry may check if another part of the object was touched within a threshold period of time (e.g., within 1 second). If additional input was received, the control circuitry returns to 804 to process the new selection and store it at step 806. If no additional object is selected (e.g., because the user stops sliding a finger across the touchscreen), process 800 proceeds to 810.

At 810, the control circuitry may check if historical data is available in memory for the current user. If not, process 800 proceeds to 816. If the data is available it is received at step 812 (e.g., from memory 706). The control circuitry may then evaluate the current input sequence and adjust it based on the historical data at step 814. For example, if the user commonly mistakenly touches the head instead of the neck, a head selection can be changed to a neck selection. After the sequence is adjusted, process proceeds to step 816.

At 816, the control circuitry configures fins of one or more vents to sequentially (or simultaneously) direct air from one or more vents to one or more locations defined by the sequence that was created at step 806. For example, the control circuitry may use a vent controller to direct the air first to the head of the user, and then to the hands of the user using vent system 300 or 700.

It will be understood that process 800 is merely illustrative and that various changes can be made within the scope of the disclosure. For example, in some embodiments, historical data is not retained or utilized and steps 810, 812, and 814 can be omitted. In some embodiments, instead of steps 810, 812, and 814, one or more initialization or setup steps can be used to improve the accuracy of user selections. For example, the ventilation system can prompt the user to make one or more selections on the user interface and use the selected locations to more accurately interpret subsequent user selections at step 804.

In some embodiments, any of the ventilation systems described herein can include a mechanism for controlling air flow rate and air flow direction using the same control mechanism, e.g. a mechanism driven a by a single motor or actuator controlled by vent controller (e.g., vent controller 708 of FIG. 7). FIGS. 9-13 depict one such exemplary mechanism that can be placed, for example, in vent ducts 306 to control flow from vents 106 and 110. In some embodiments, the mechanism may be used to direct air to the right-front winnow (or left-front window) of the vehicle (e.g., to defrost it) while simultaneously reducing the air flow rate (e.g., to prevent too much air being directed to the side window). The mechanism may include a flow direction member, a flow rate member, both controlled by a single control member that can be rotated by a motor or by an actuator (e.g., controlled by vent controller 708). In FIGS. 9-13, like reference numerals refer to like objects.

Figure 9A:
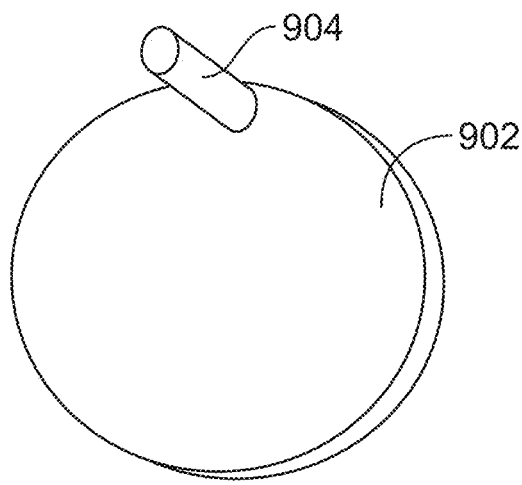
FIGS. 9A-9C show several views of a flow direction member of an assembly, in accordance with some embodiments of the present disclosure.
Figure 9B:
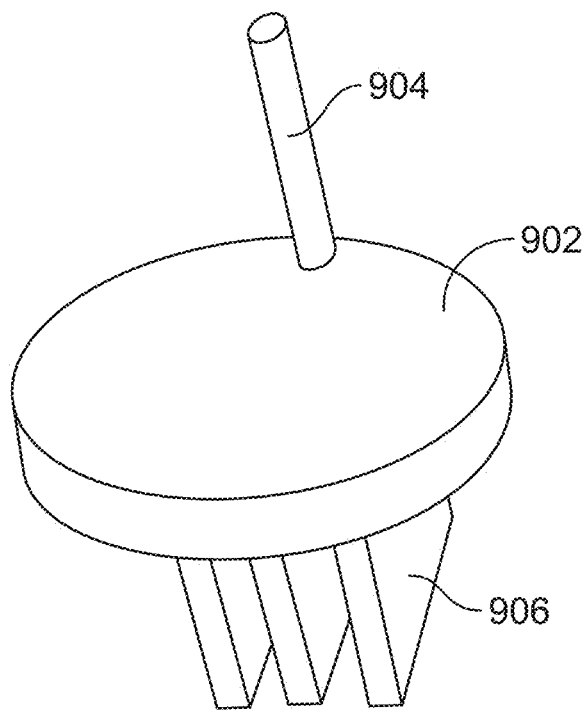
Figure 9C:
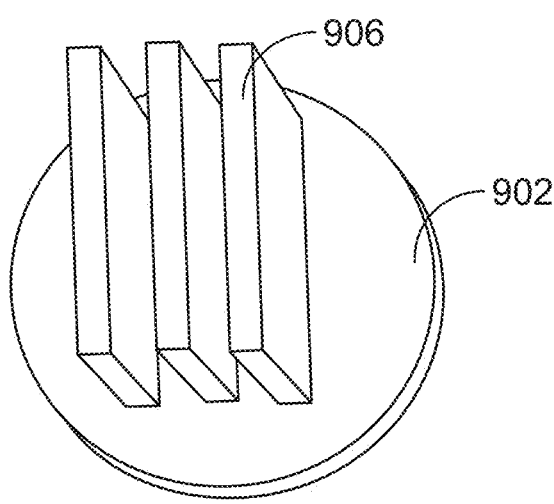

FIG. 9A depicts a top view of flow direction member 902. FIG. 9B depicts a side view of flow direction member 902. FIG. 9C depicts a bottom view of flow direction member 902. In some embodiments, flow direction member 902 includes a disk with two flat surfaces. In some embodiments, the surfaces may not be flat (e.g., they may include ridges, depressions, cut out, etc.) In some embodiments, elongated follower 904 may be attached to one of the flat surfaces of flow direction member 902. For example, the follower may be a cylinder extending orthogonally away from the flat surface. In some embodiments, follower 904 may comprise a bushing or a bearing to reduce friction when during operation. In some embodiments, fins 906 may be attached to the other flat surface of flow direction member 902. In some embodiments, fins 906 are used to direct air in a direction generally parallel to the fins.

Figure 10A:
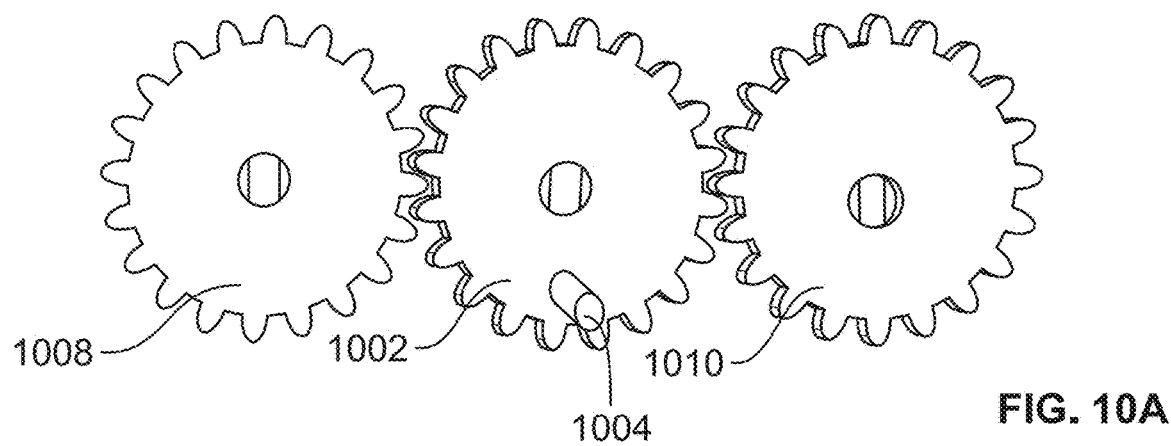
FIGS. 10A-10C show several views of a flow rate member of the assembly, in accordance with some embodiments of the present disclosure.
Figure 10B:
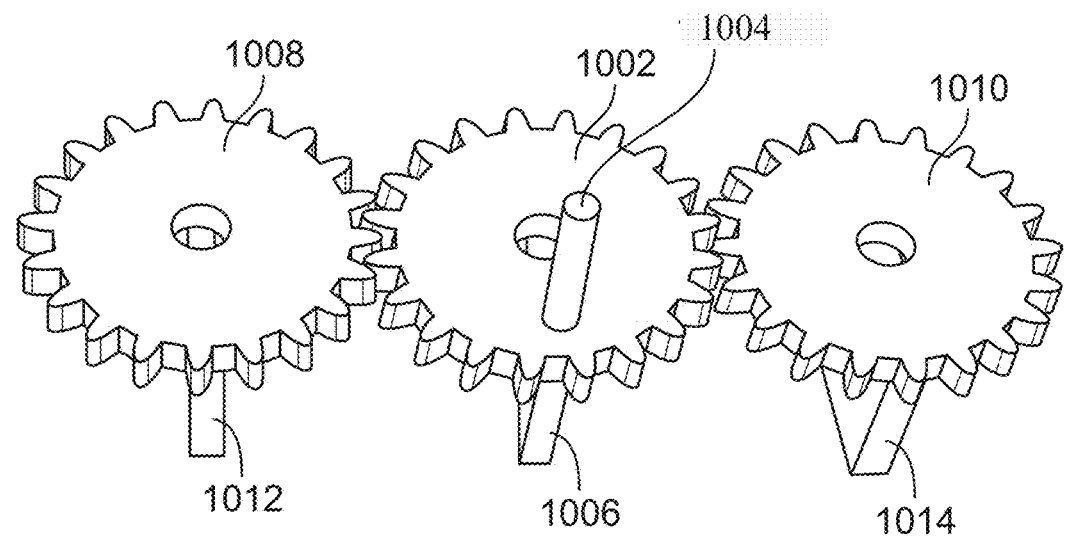
Figure 10C:
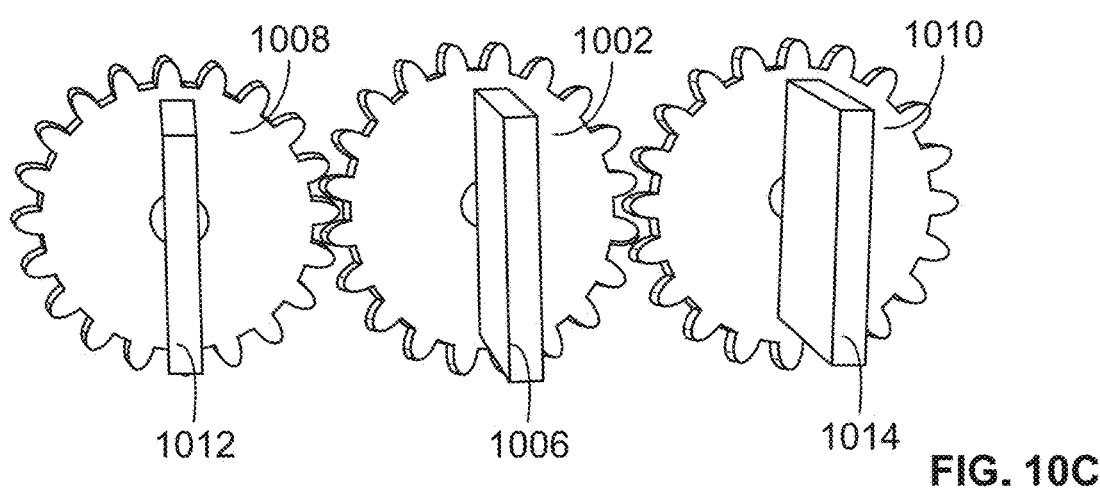

FIG. 10A depicts a top view of flow rate member 1002. FIG. 10B depicts a side view of flow rate member 1002. FIG. 10C depicts a bottom view of flow rate member 1002. In some embodiments, flow rate member 1002 comprises a gear and includes two opposite flat surfaces. In some embodiments, the surfaces may not be flat (e.g., they may include ridges, depressions, cut out, etc.) In some embodiments, flow rate member 1002 includes a disk with two flat surfaces. In some embodiments, elongated follower 1004 may be attached to one of the flat surfaces of flow rate member 1002. For example, the follower may be a cylinder extending orthogonally away from the flat surface. In some embodiments, barrier 1006 may be attached to the other flat surface of flow rate member 1002.

In some embodiments, flow rate member 1002 may be mechanically enmeshed to two gears 1008 and 1010, as shown. Gears 1008 and 1010 may include respective barriers 1012 and 1014 attached to one of the flat surfaces of the respective gears. In some embodiments, gears 1008 and 1010 may be mechanically enmeshed with flow rate member 1002 such that gears 1008 and 1010 rotate in a direction opposite to the direction of rotation of flow rate member 1002. In some embodiments, barriers 1006, 1012, and 1014 may line up to block airflow, to allow airflow, or to allow certain percentages of the airflow depending on the rotational orientation of gears 1008, 1002, and 1010.

Figure 11A:
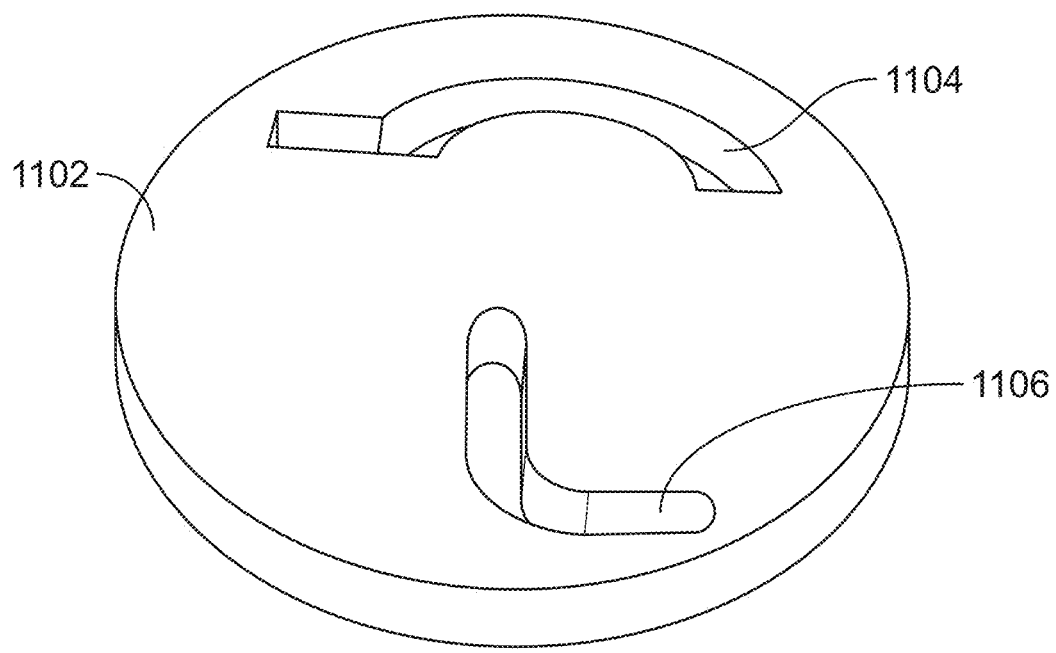
FIGS. 11A-11B show several views of a control member of the assembly, in accordance with some embodiments of the present disclosure.
Figure 11B:
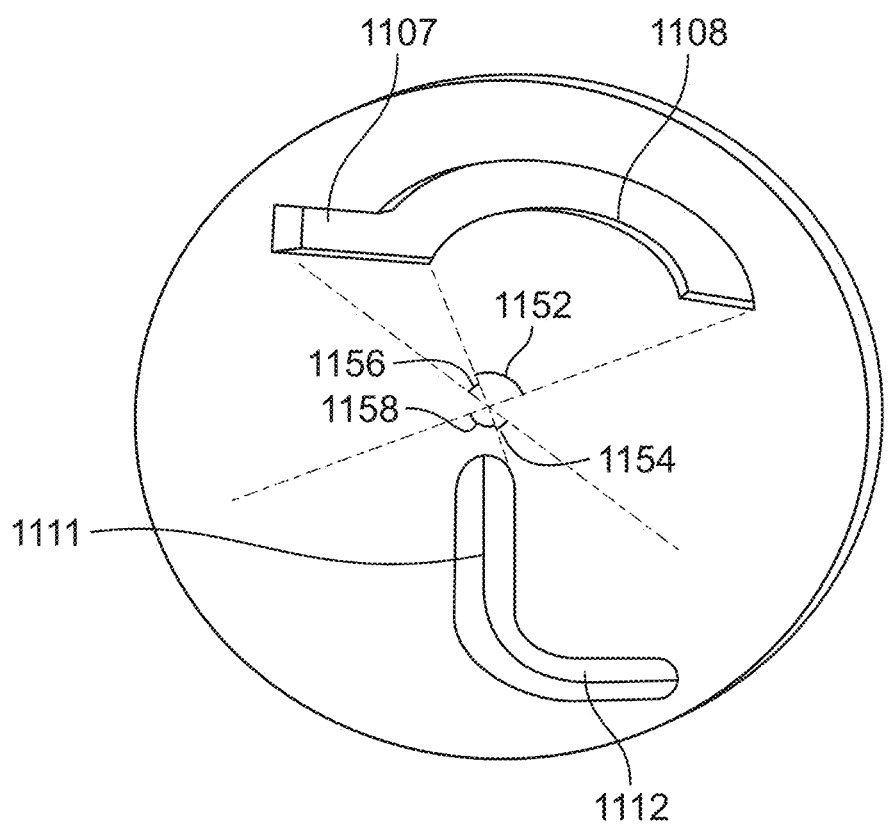

FIG. 11A depicts a side view of control member 1102. FIG. 11B depicts a top view of control member 1102. In some embodiments, control member 1102 may be a disc or cylinder (or any other shape) that includes two surfaces opposite each other. In some embodiments, the surfaces are flat. In some embodiments, the surfaces may not be flat (e.g., they may include ridges, depressions, cut out, etc.) In some embodiments, control member 1102 includes two routes (e.g., slots or grooves 1104 and 1106). In some embodiments, control member 1102 may be connected to a motor that can rotate the control member about its longitudinal axis.

In some embodiments, route 1104 includes first portion 1107 and second portion 1108. In some embodiments, route 1106 includes a third portion 1112 and a fourth portion 1111. First portion 1107 may be a straight line along the first surface of control member 1102 and second portion 1108 may be an arc having a constant radius centered on the axis of rotation of control member 1102.

Third portion 1112 may be an arc having a constant radius centered on the axis of rotation of control member 1102. Fourth portion 1111 may be a straight line along the first surface of control member 1102. In some embodiments, fourth portion 1111 is perpendicular to first portion 1107.

In some embodiments, follower 904 of flow direction member 902 may interface with route 1106 (e.g., be inserted into the depicted slot), while follower 1004 of flow rate member 1002 may interface with route 1104 (e.g., be inserted into the depicted slot). When control member 1102 rotates within angle 1158 (e.g., such that follower 904 travels along fourth portion 1111), follower 904 causes flow direction member 902 to rotate. However, when control member 1102 rotates within angle 1154 (e.g., such that follower 904 travels along third portion 1112), follower 904 no longer causes flow direction member 902 to rotate due to the curvature of third portion 1112 matching a curve defined by rotation of control member 1102. It will be understood that the depiction of routes 1104 and 1106 is merely illustrative and are not necessarily to scale.

Initially, when control member 1102 starts rotating within angle 1154, it also rotates within angle 1152 such that follower 1004 travels along second portion 1108. At this point, follower 1004 does not impart any rotation to flow rate member 1002, due to curvature of second portion 1108 matching a curve defined by rotation of control member 1102. Eventually, when control member 1102 continues to rotate within angle 1154, it will also begin to rotate within angle 1156. At this point, follower 904 still travels along curved portion 1112 imparting no rotation to flow direction member 902, however, follower 1004 begins to travel along first portion 1107 and thus begins to impart rotation on flow rate member 1002. Rotation of flow rate member 1002 imparts counterrotation to gears 1008 and 1010, eventually causing barriers 1012, 1006, and 1014 to line up to block the airflow.

Figure 12A:
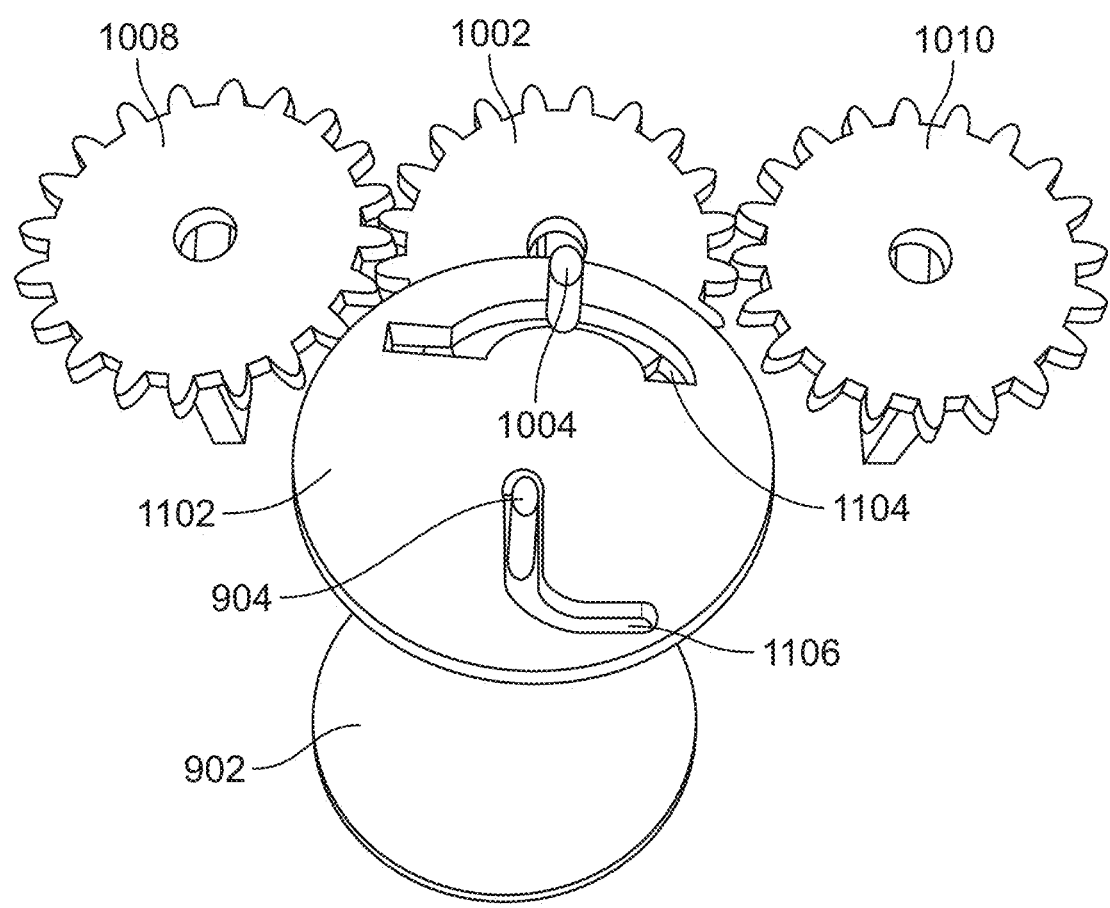
FIG. 12A shows a top view of the assembly configured to control both direction and flow rate of gas (e.g., air) in a ventilation system, in accordance with some embodiments of the present disclosure.
Figure 12B:
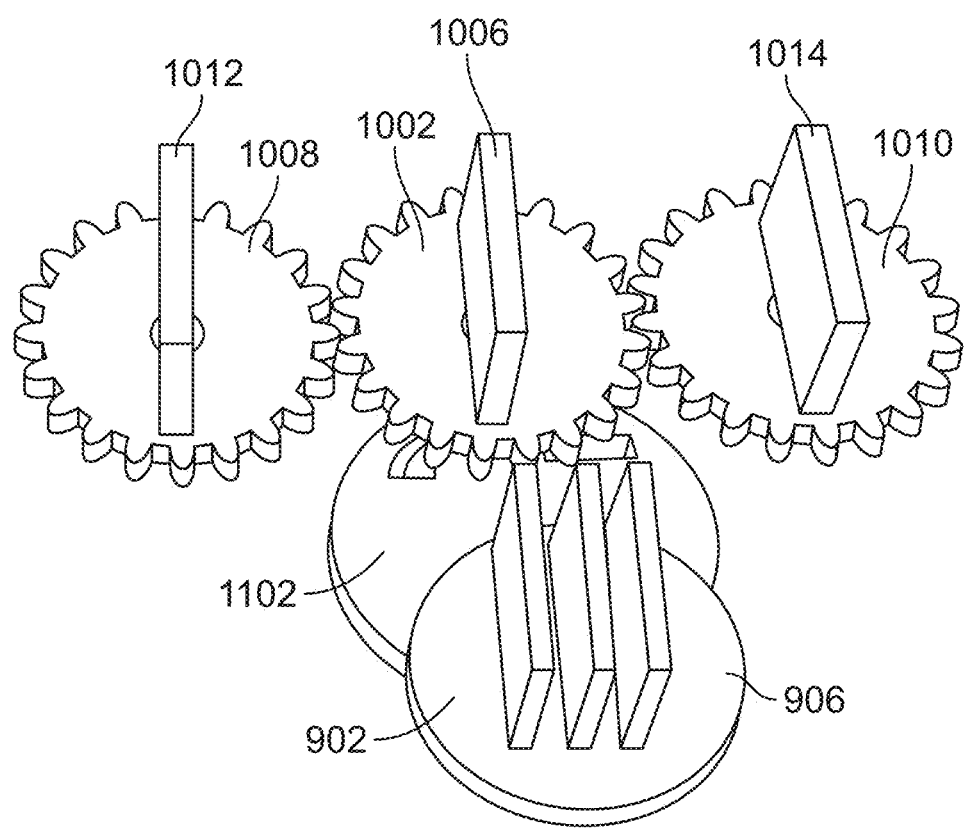
FIG. 12B shows a bottom view of the assembly configured to control both direction and flow rate of gas (e.g., air) in a ventilation system, in accordance with some embodiments of the present disclosure.

FIG. 12A depicts a top view of an assembly including control member 1102, flow rate member 1002, and flow direction member 902. FIG. 12B depicts a bottom view of the assembly including control member 1102, flow rate member 1002, and flow direction member 902.

In the shown configuration, follower 904 is travelling along the flat portion of route 1106, which causes rotation to flow direction member 902. At the same time, follower 1004 is travelling along curved portion of route 1104, which results in no rotation being applied to flow rate member 1002 and no rotation being applied to gears 1008 and 1010. As shown, barriers 1012, 1006, and 1014 are spaced from each other resulting in free flow of air (e.g., along duct 306 of FIG. 3). This position of control member 1102 enables a ventilation system to control the direction of air flow without affecting the flow rate.

Figure 13A:
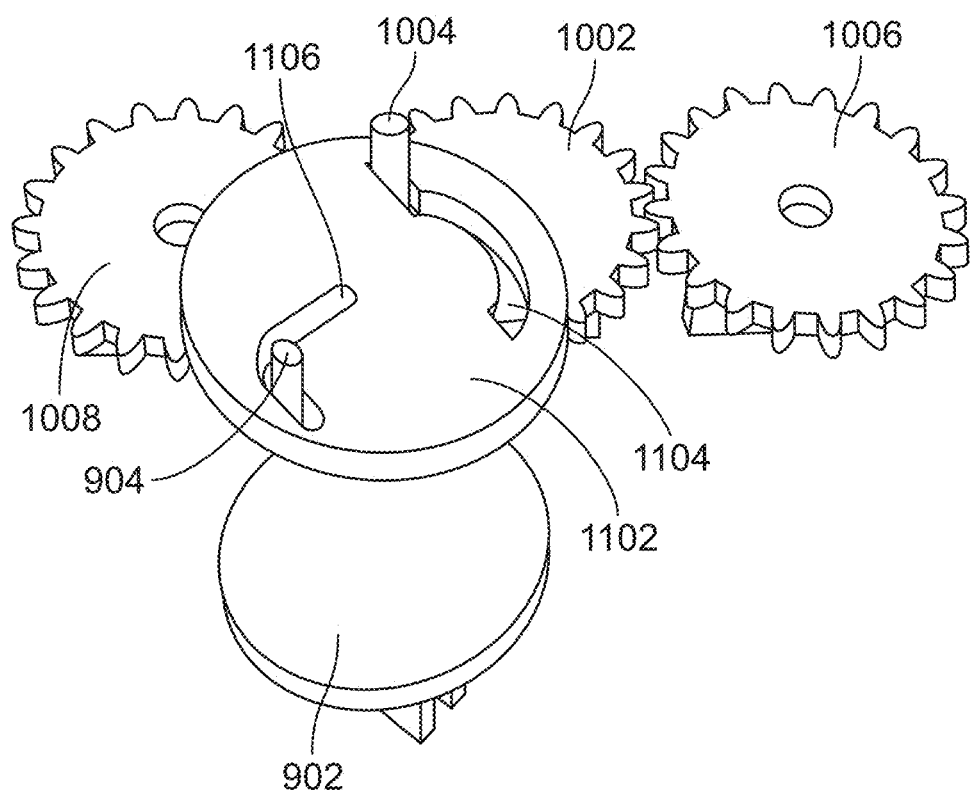
FIG. 13A shows another top view of the assembly configured to control both direction and flow rate of gas (e.g., air) in a ventilation system, in accordance with some embodiments of the present disclosure.
Figure 13B:
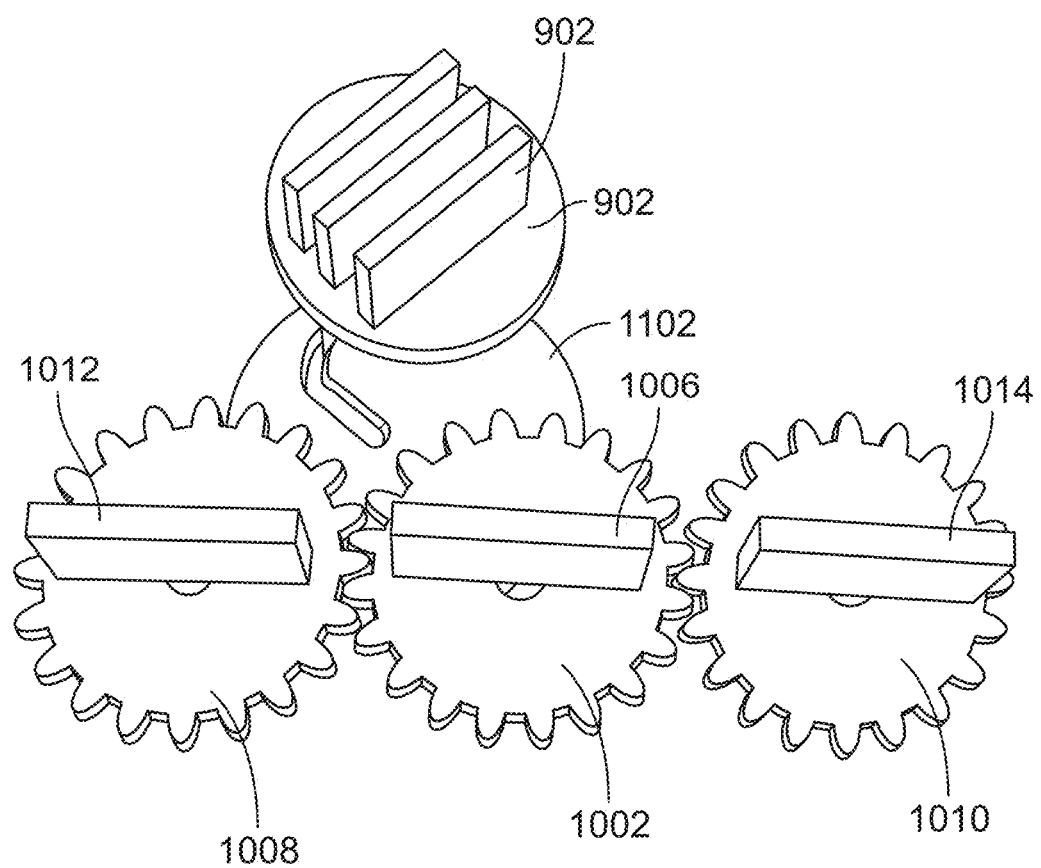
FIG. 13B shows another bottom view of the assembly configured to control both direction and flow rate of gas (e.g., air) in a ventilation system, in accordance with some embodiments of the present disclosure.

FIG. 13A depicts another top view of an assembly including control member 1102, flow rate member 1002, and flow direction member 902. FIG. 13B depicts another bottom view of the assembly including control member 1102, flow rate member 1002, and flow direction member 902. The configuration shown in FIGS. 13A-B may result from starting in the position shown in FIGS. 12A-B and rotating control member 1102 clockwise (e.g., by 45 degrees).

As shown, follower 904 is now travelling along the curved portion of route 1106, which causes no rotation being imparted to flow direction member 902. At the same time, follower 1004 is travelling along straight portion of route 1104, which results in rotation being applied to flow rate member 1002 and counterrotation being applied to gears 1008 and 1010. As shown, barriers 1012, 1006, and 1014 are aligned and substantially block the flow of air (e.g., along one of ducts 306 of FIG. 3) being blocked. This position of control member 1102 enables a ventilation system to control the flow rate without affecting the direction of the air flow.

It will be understood that the mechanism of FIGS. 9-13 is merely illustrative and various modifications can be made within the scope of the invention. For example, various modification can be made to the routes (e.g., routes 1104 and 1106) described above. The mechanism described above includes a first range of motion that only affects the direction of flow, a second range of motion that does not affect direction or rate, and a third range of motion that only affects flow rate. In some embodiments, the routes may be arranged such that a first range of motion only affects direction of flow, a second range of motion affects both direction and rate, and a third range of motion that only affects flow rate. In some embodiments, the routes may be arranged such that a first range of motion only affects direction of flow and a second range of motion that either only affects flow rate or affects both direction and rate, without a third range of motion. The mechanism of FIGS. 9-13 may be used to switch the functionality of a vent, for example, between use as a cabin vent and as a front-side window defrost vent. A first range of motion can be used to direct flow within the cabin and a second range of motion can be used to decrease flow rate and direct the flow against a front-side window. In some embodiments, a linkage can be used to couple the motion of control member 1102 to a second flow direction member (e.g., to enable control of both the horizontal and vertical direction of flow using a single actuator). It will also be understood that any suitable mechanical linkage can be used to control both direction of flow and flow rate using a single actuator in accordance with the present disclosure. In some embodiments, mechanism of FIGS. 9-13 can be used to control two directions of flow as opposed to one direction and flow rate. In some such embodiments, an actuator can be mechanically linked to two control members, oriented perpendicular to each other, to control, for example, a horizontal direction and a vertical direction of flow.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following paragraphs.

What is claimed is:

1. A vehicle ventilation system, comprising:
    a touch screen configured to:
        display an object; and
        receive a selection of a part of the object;
    an air vent that comprises at least one controllable fin;
    at least one motor configured to control the configuration of the at least one fin; and
    control circuitry configured to:
        controlling the at least one fin, using the at least one motor, to direct air from the air vent to a location that corresponds to the selected part of the object.

2. The vehicle ventilation system of claim 1, wherein:
    the at least one controllable fin comprises a first plurality of fins and a second plurality of;
    the at least one motor comprises:
        a first motor configured to control a horizontal orientation of the first plurality of fins; and
        a second motor configured to control a vertical orientation of the second plurality of fins.

3. The vehicle ventilation system of claim 1, wherein the at least one controllable fin of the air vent does not have a manual control.

4. The vehicle ventilation system of claim 1,
    wherein the touch screen is configured to:
        display a representation of a human body; and
        receive a selection of a part of the human body; and
    wherein the control circuitry is configured to:
        control the at least one controllable fin, using the at least one motor, to direct air from the air vent to the selected body part.

5. The vehicle ventilation system of claim 1,
    wherein the touch screen is configured to:
        receive a plurality of consecutive selections of a plurality of parts of the object; and
    wherein the control circuitry is configured to:
        control the at least one controllable fin based on the selections of the plurality of parts of the object.

6. The vehicle ventilation system of claim 5, wherein the control circuitry is configured to control the at least one controllable fin by:
    sequentially controlling the at least one controllable fin to direct air from the air vent to each of the plurality of parts of the object.

7. The vehicle ventilation system of claim 5, wherein, wherein the control circuitry is configured to control the at least one controllable fin by:
    receive historical selection data;
    adjust selection of the plurality of parts of the object based on the historical selection data; and
    sequentially configure the at least one controllable fin to direct air from the air vent to each of the adjusted plurality of parts of the object.

8. The vehicle ventilation system of claim 7, wherein:
    the control circuitry is configured to generate a recommended selection of a plurality of parts of the object; and
    wherein the touch screen is configured to display the recommended selection.

9. The vehicle ventilation system of claim 1,
    wherein the touch screen is configured to:
        receive a temperature selection; and
    wherein the control circuitry is configured to:
        adjust the temperature of air delivered via the air vent based on the temperature selection.

10. The vehicle ventilation system of claim 1,
    wherein the touch screen is configured to:
        receive a plurality of consecutive temperature selections; and
    wherein the control circuitry is configured to:
        sequentially adjust the temperature of air delivered via the air vent based on consecutive temperature selections.

11. A method for ventilating a vehicle, the method comprising:
    displaying, using a touch screen, an object;
    receiving, using the touchscreen, a selection of a part of the object;
    controlling, using a control circuitry, at least one controllable fin of an air vent, using at least one motor, to direct air from the air vent to a location that corresponds to the selected part of the object.

12. The method of claim 11, wherein:
    the at least one controllable fin comprises a first plurality of fins and a second plurality of fins;
    the at least one motor comprises:
        a first motor configured to control a horizontal orientation of the first plurality of fins; and
        a second motor configured to control a vertical orientation of the second plurality of fins.

13. The method of claim 11, wherein the at least one controllable fin of the air vent does not have a manual control.

14. The method of claim 11, further comprising:
    displaying a representation of a human body;
    receiving a selection of a part of the human body; and
    controlling the at least one controllable fin, using the at least one motor, to direct air from the air vent to the selected body part.

15. The method of claim 11, further comprising:
    receiving a plurality of consecutive selections of a plurality of parts of the object; and
    controlling the at least one controllable fin based on the selections of the plurality of parts of the object.

16. The method of claim 15, wherein controlling the at least one controllable fin based on the selections of the plurality of parts of the object comprises:
    sequentially controlling the at least one controllable fin to direct air from the air vent to each of the plurality of parts of the object.

17. The method of claim 15, wherein controlling the at least one controllable fin based on the selections of the plurality of parts of the object comprises:
   receiving historical selection data;
   adjusting selection of the plurality of parts of the object based on the historical selection data; and
   sequentially controlling the at least one controllable fin to direct air from the air vent to each of the adjusted plurality of parts of the object.

18. The method of claim 17, further comprising:
   generating a recommended selection of a plurality of parts of the object; and
   displaying the recommended selection.

19. The method of claim 11, further comprising:
   receiving a temperature selection; and
   adjusting the temperature of air delivered via the air vent based on the temperature selection.

20. The method of claim 11, further comprising:
   receiving a plurality of consecutive temperature selections; and
   sequentially adjusting the temperature of air delivered via the air vent based on consecutive temperature selections.

* * * * *